United States Patent [19]

Yoshida

[11] Patent Number: 4,616,354
[45] Date of Patent: Oct. 7, 1986

[54] TRACKING CONTROL ARRANGEMENTS FOR USE IN OPTICAL DISC PLAYERS

[75] Inventor: Tadao Yoshida, Kanagawa, Japan

[73] Assignee: Sony Corporation, Tokyo, Japan

[21] Appl. No.: 588,929

[22] Filed: Mar. 13, 1984

[30] Foreign Application Priority Data

Mar. 14, 1983 [JP] Japan ............................. 58-41842

[51] Int. Cl.$^4$ .............................................. G11B 7/00
[52] U.S. Cl. ............................................. 369/44; 369/32; 369/33; 369/45; 250/201
[58] Field of Search ................... 369/43–47, 369/41, 32, 33; 358/142; 250/201-204

[56] References Cited

U.S. PATENT DOCUMENTS 4,232,201 11/1980 Canino .............................. 369/44

Primary Examiner—Robert L. Richardson
Attorney, Agent, or Firm—Lewis H. Eslinger; Alvin Sinderbrand

[57] ABSTRACT

A tracking control arrangement for use in an optical disc player comprises a photodetecting assembly including a plurality of photodetecting elements each provided for receiving a light beam caused to impinge on an optical disc to read an information signal recorded in a record track thereon and reflected thereat and for producing an output in response to the received light beam, an operational circuit operative to generate from the outputs of the photodetecting elements a reproduced information signal and a resultant signal varying in phase relative to the reproduced information signal in response to the direction of deviation of a beam spot formed on the optical disc by the light beam from the center of the record track and varying in amplitude in response to the amount of the deviation, an error signal generating circuit operative to generate a tracking error signal in the form of voltage held by voltage holding means on the basis of both the reproduced information signal and the resultant signal obtained from the operational circuit and provided with discharging means for making the voltage holding means discharge to cause the tracking error signal to be zero or close to zero while the light beam is projected onto a non-reflecting portion of the optical disc, and a driving circuit for driving in response to the tracking error signal an optical device emitting the light beam to control the position of the beam spot on the optical disc so that the beam spot is correctly located on the record track.

4 Claims, 29 Drawing Figures

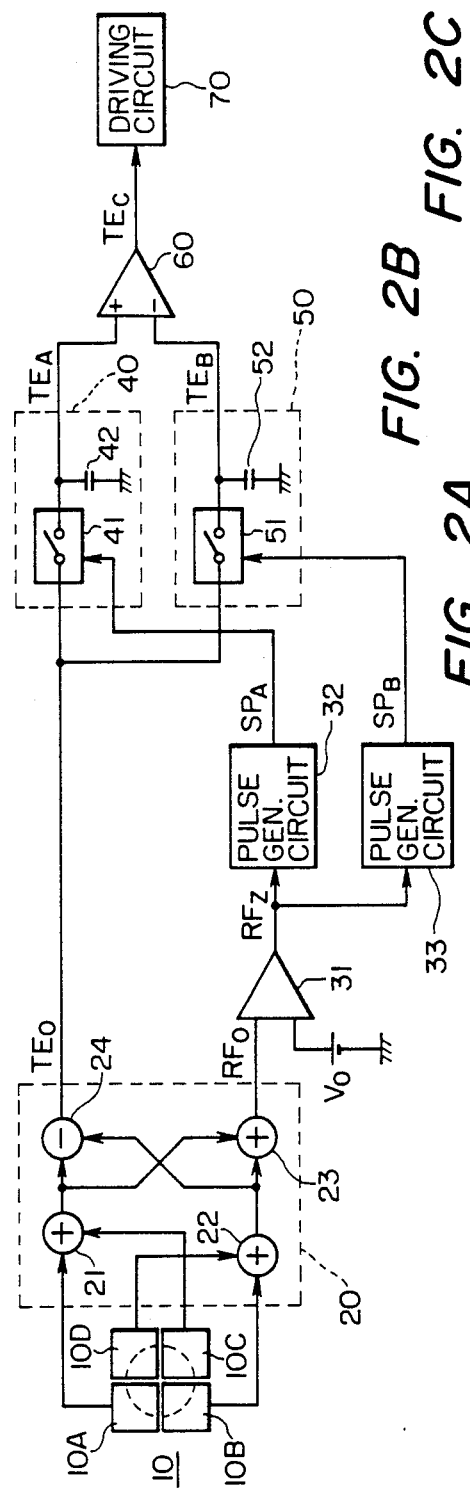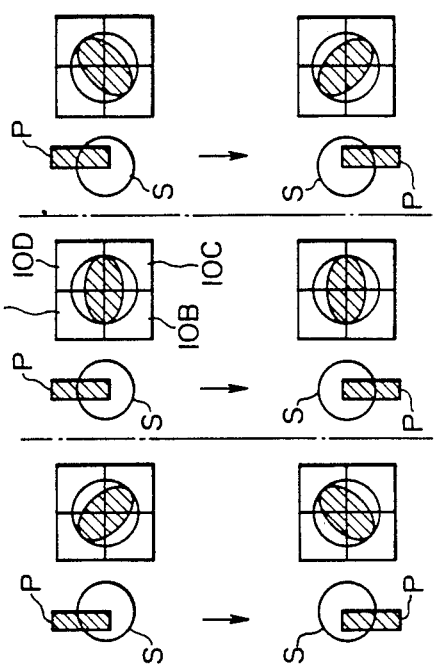
FIG. 1 PRIOR ART
FIG. 2A  FIG. 2B  FIG. 2C

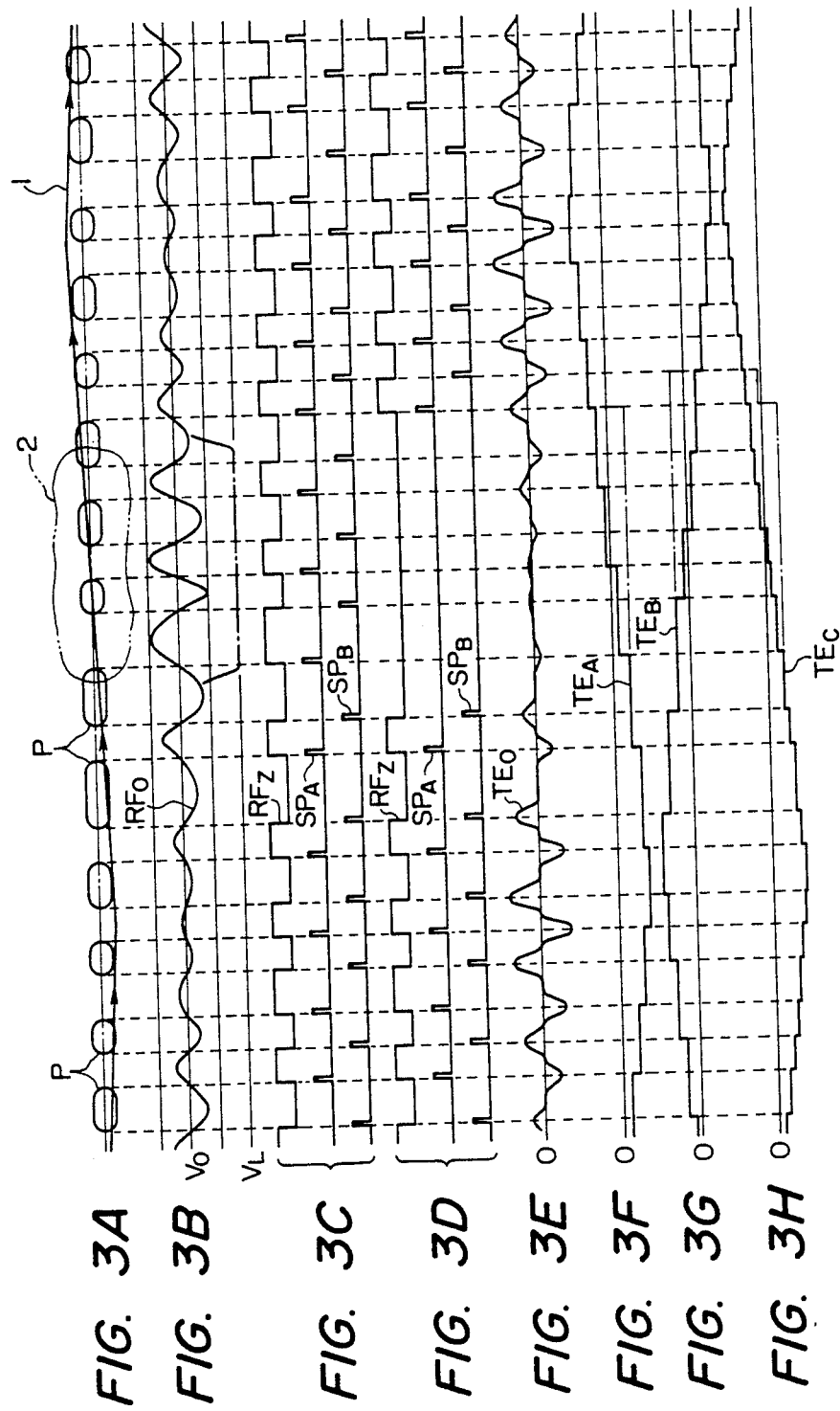

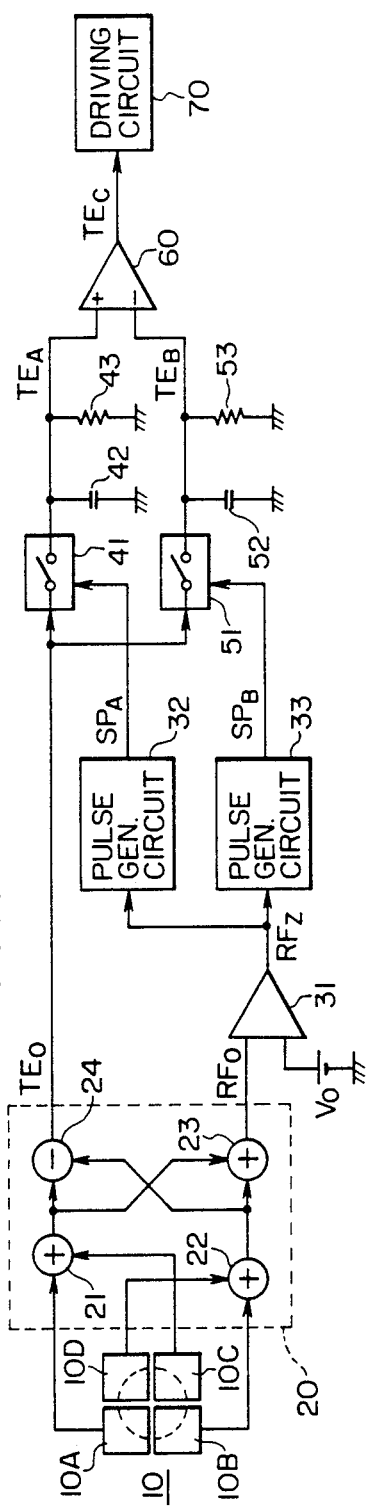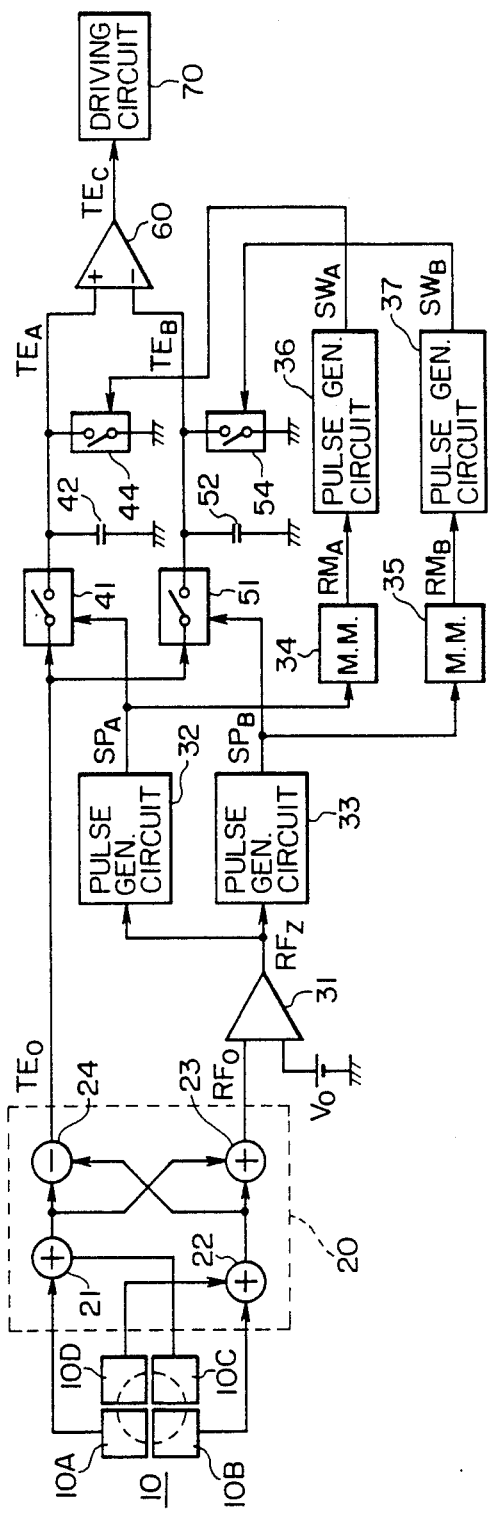
FIG. 4
FIG. 5

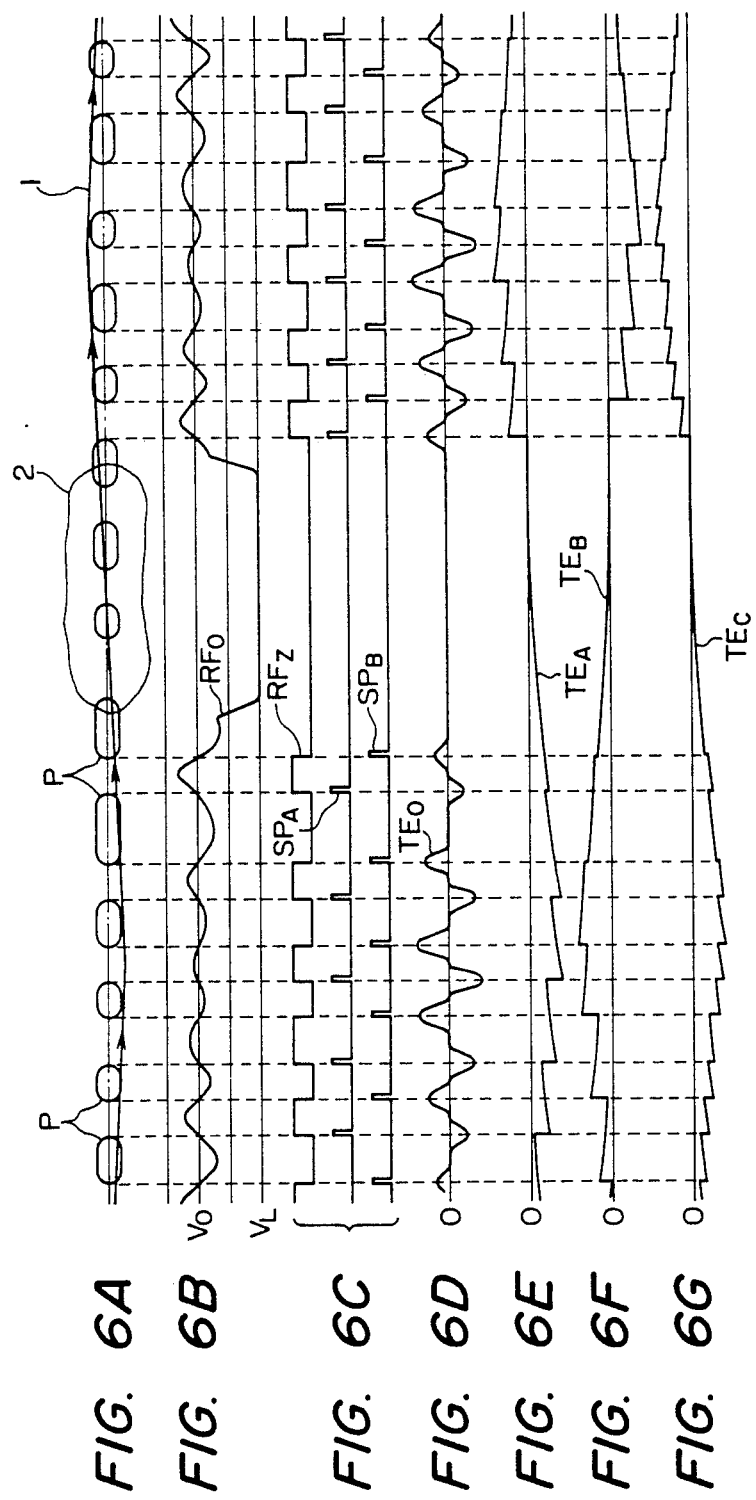

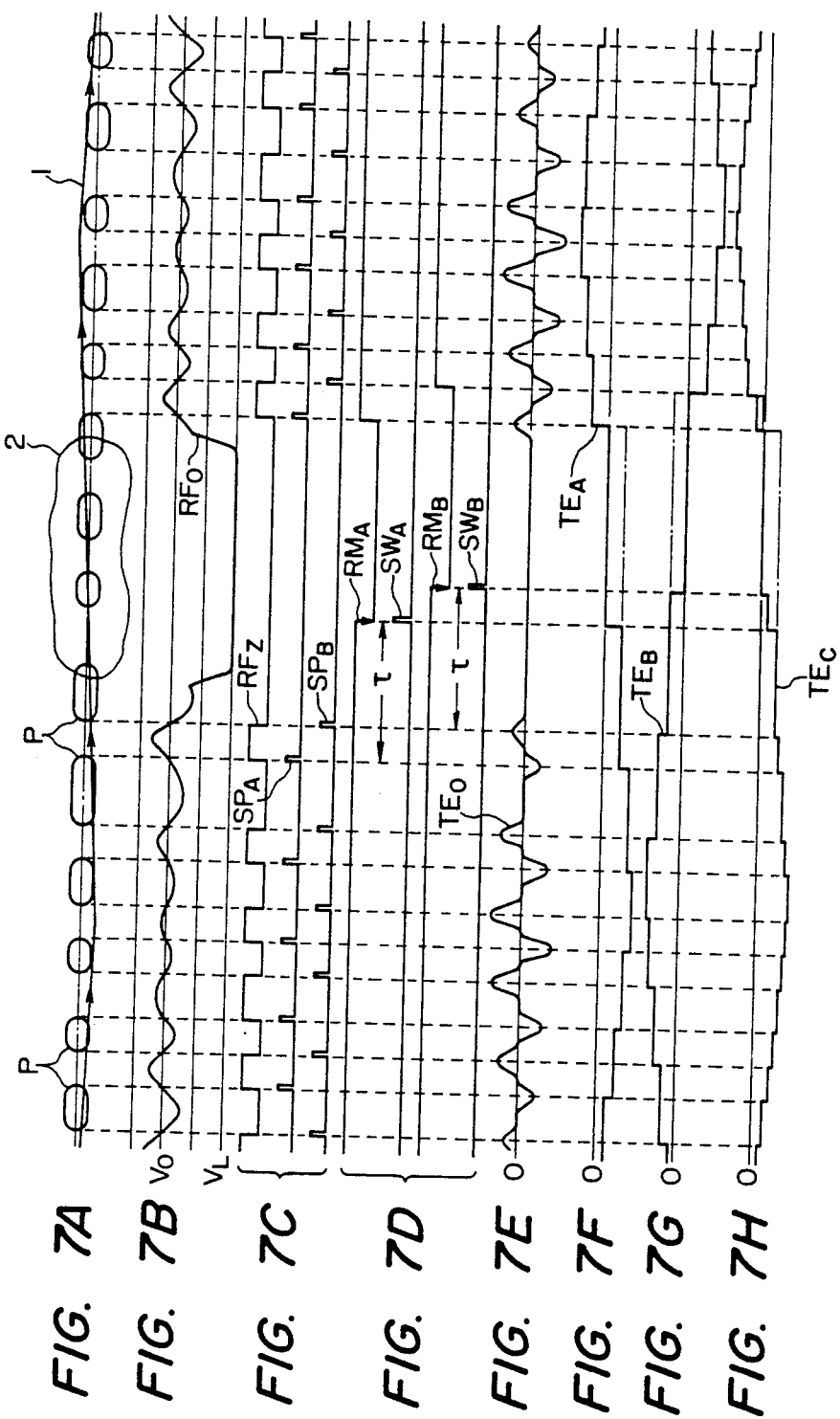

TRACKING CONTROL ARRANGEMENTS FOR USE IN OPTICAL DISC PLAYERS

BACKGROUND OF THE INVENTION

1. Field of the Invention

This invention relates generally to an optical disc player for reproducing optically an information signal from an optical disc, such as an optical digital audio disc, on which the information signal is recorded in a record track formed with an arrangement of a plurality of small pits, and more particularly is directed to a tracking control arrangement which is operative to maintain a light beam impinging on an optical disc to read an information signal therefrom in correct tracking relation to a record track on the optical disc in an optical disc player.

2. Description of the Prior Art

In an optical disc player for reproducing an information signal from an optical disc, such as an optical digital audio disc, on which the information signal is recorded in the form of small pits arranged in a spiral record track, a light beam is used for reading the information signal from the spiral record track on the optical disc. The light beam is emitted from an optical head which in moved in the direction of the radius of the optical disc, and is required to trace correctly the spiral record track on the optical disc. To make the light beam comply with this requirement, tracking control is performed. In the tracking control, the position of a beam spot formed by the light beam on the surface of the optical disc in relation to the spiral record track is detected to produce a tracking detection output, and a focusing lens in the optical head or the optical head in its entirety is then moved in the direction of the radius of the optical disc in response to the tracking detection output.

To detect the position of the beam spot on the surface of the optical disc in relation to the spiral record track, there have been proposed several detecting arrangements. These are classified into two types, one of which uses two special light beams provided in addition to the light beam for reading the information signal, and the other of which does not use any light beam other than the one for reading the information signal. As an arrangement of the type operative without two special light beams, a detecting arrangement such as so-called "heterodyne system" or "DPD system" has been known.

FIG. 1 of the accompanying drawings shows a previously proposed tracking control arrangement employing the detecting arrangement so called "heterodyne system" or "DPD system" in an optical disc player which has an optical head for causing a light beam to impinge on an optical disc having a spiral record track formed with pits thereon. In the optical head, a photodetector 10 composed of four photodetecting elements 10A, 10B, 10C and 10D is provided to receive the light beam modulated in intensity and reflected at the optical disc. The outputs of the photodetecting elements 10A to 10D are supplied to an operational circuit 20. In the operational circuit 20, the outputs of the photodetecting elements 10A and 10C are added to each other in an adding circuit 21, the outputs of the photodetecting elements 10B and 10D are added to each other in an adding circuit 22, the added outputs on the adding circuits 21 and 22 are further added to each other in an adding circuit 23 to produce an added signal $RF_0$ which is the sum of the outputs of the photodetecting elements 10A to 10D, and subtraction of the added outputs of the adding circuits 21 and 22 is performed in a subtracting circuit 24 to produce a subtracted signal $TE_0$ which is the difference between the added output obtained from the adding circuit 21 and the added output obtained from the adding circuit 22.

The light beam incident upon the optical disc for reading the information signal therefrom is diffracted by the pits arranged in the spiral record track on the optical disc to be reflected thereat. Accordingly, the reflected light beam modulated at the optical disc and reaching the photodetector 10 to form its beam spot on the photodetecting elements 10A to 10D forms a diffraction pattern varying in response to the positional relation between each pit on the optical disc and the beam spot on the optical disc formed by the light beam irradiating the pit.

FIGS. 2A, 2B and 2C of the accompanying drawings show such a diffraction pattern and the positional relation obtained in several different situations. In each of FIGS. 2A, 2B and 2C, the positional relation between the pit P and the beam spot S of the light beam irradiating the pit P is shown in the left side, and the diffraction pattern (a shaded portion) in the beam spot formed on the photodetecting elements 10A to 10D by the reflected light beam in consequence of the positional relation shown in the left side is shown in the right side. The pit P moves in relation to the beam spot S so that the situation shown in the upper side is changed into the situation shown in the lower side. In the case of FIG. 2A, the beam spot S is deviated inward on the optical disc from the center on the pit P. In the case of FIG. 2B, the beam spot S is correctly located at the center of the pit P. In the case of FIG. 2C, the beam spot S is deviated outward on the optical disc from the center of the pit P.

From the presentations of FIGS. 2A, 2B and 2C, it can be seen that the diffraction pattern which causes all the photodetecting elements 10A to 10D to be supplied with the same amount of light, is obtained, when the beam spot S is correctly located at the center of the pit P. The diffraction pattern becomes such that the amount of light supplied to the photodetecting elements 10A to 10D is asymmetric, when the beam spot S is deviated inward or outward on the optical disc from the center of the pit P. The form of asymmetry is opposite for deviation caused inward and outward, and the greater the deviation is, the greater the asymmetry occurs.

Consequently, the subtracted signal $TE_0$ obtained from the subtracting circuit 24 in the operational circuit 20 as a result of the difference between the sum of the outputs of the photodetecting elements 10A and 10C and the sum of the outputs of the photodetecting elements 10B and 10D, can be used to produce a tracking error signal which represents the amount and direction of the deviation of the beam spot S from the center of the record track. The added signal $RF_0$ obtained from the adding circuit 23 in the operational circuit 20 as a result of the total sum of the outputs of the photodetecting elements 10A to 10D, is used as a reproduced information signal.

In the case where the beam spot on the optical disc traces the record track formed with the arrangement of the pits P along a meandering path 1 as shown in FIG. 3A, the added signal $RF_0$ used as the reproduced information signal is obtained in such a form as to have a falling cross-over point in respect of a constant level $V_0$ when the beam spot passes the front edge of each pit P and to have a rising cross-over point in respect of the constant level $V_0$ when the beam spot passes the rear edge of each pit P, as shown in FIG. 3B. On the other hand, the subtracted signal $TE_0$ used to produce the tracking error signal is obtained in the respective different manners taken in the situation in which the beam spot is deviated inward on the optical disc from the center of the record track and the situation in which the beam spot is deviated outward on the optical disc from the center of the record track, respectively. In the situation in which the beam spot is deviated inward on the optical disc from the center of the record track as shown in FIG. 2A, the subtracted signal $TE_0$ is positive when the beam spot passes the front edge of each pit P and therefore the added signal $RF_0$ has the falling cross-over point in respect of the constant level $V_0$, and is negative when the beam spot passes the rear edge of each pit P and therefore the added signal $RF_0$ has the rising cross-over point in respect of the constant level $V_0$, as shown in the left half of FIG. 3E. In the situation in which the beam spot is deviated outward on the optical disc from the center of the record track as shown in FIG. 2C, the subtracted signal $TE_0$ is negative when the beam spot passes the front edge of each pit P and therefore the added signal $RF_0$ has the falling cross-over point in respect of the constant level $V_0$, and is positive when the beam spot passes the rear edge of each pit P and therefore the added signal $RF_0$ has the rising cross-over point in respect of the constant level $V_0$, as shown in the right half of FIG. 3E. The greater the deviation caused inward and outward is, the larger the amplitude of the subtracted signal $TE_0$ becomes.

The added signal $RF_0$ obtained from the operational circuit 20 is supplied to a voltage comparator 31. At the voltage comparator 31, the added signal $RF_0$ is compared with the constant level $V_0$ to produce a modified signal $RF_Z$ shaped into a rectangular waveform as shown in FIG. 3C. The modified signal $RF_Z$ is supplied to pulse generating circuits 32 and 33. From the pulse generating circuit 32, a pulse $SP_A$ having narrow pulse-width is obtained at each rising edge of the modified signal $RF_Z$, and from the pulse generating circuit 33, a pulse $SP_B$ having narrow pulse-width is obtained at each falling edge of the modified signal $RF_Z$, as shown in FIG. 3C.

The subtracted signal $TE_0$ from the operational circuit 20 is supplied to switches 41 and 42 provided for sampling in sampling-and-hold circuits 40 and 50, respectively. The pulses $SP_A$ and $SP_B$ are also supplied to the switches 41 and 51, respectively, so that the level of the subtracted signal $TE_0$ at the instant at which the beam spot on the optical disc passes the front edge of each pit P is sampled by the pulse $SP_A$ at the switch 41, and the level of the subtracted signal $TE_0$ at the instant at which the beam spot on the optical disc passes the rear edge of each pit P is sampled by the pulse $SP_B$ at the switch 51. The level sampled at the switch 41 is held by a capacitor 42 provided for holding in the sampling-and-hold circuit 40, and the level sampled at the switch 51 is held by a capacitor 52 provided for holding in the sampling-and-hold circuit 50. Output signals $TE_A$ and $TE_B$ of the sampling-and-hold circuits 40 and 50, which are obtained across the capacitors 42 and 52 as shown in FIGS. 3F and 3G, respectively, are supplied to a differential amplifier 60 which performs subtraction of the output signals $TE_A$ and $TE_B$ to produce a signal $TE_C$ as shown in FIG. 3H at the output thereof. The signal $TE_C$ varies in its polarity, for example, from negative to positive when the beam spot moves to cross over the center of the record track outward on the optical disc, and from positive to negative when the beam spot moves to cross over the center of the record track inward on the optical disc. Further, the signal $TE_C$ has a level corresponding to the deviation of the beam spot on the optical disc from the center of the record track. Therefore, the signal $TE_C$ can be used as the tracking error signal which represents the amount and direction of the deviation of the beam spot on the optical disc from the center of the record track.

The signal $TE_C$ thus obtained is supplied to a driving circuit 70 provided for driving the focusing lens in the optical head or the optical head in its entirety to move in the direction of the radius of the optical disc, so that the position of the beam spot on the optical disc relative to the record track is controlled.

However, the previously proposed tracking control arrangement as described above encounters the following trouble when the optical disc has some non-reflecting portion due to damage or a stain on the surface thereof.

In the case where the optical disc has a non-reflecting portion 2 where the surface thereof is damaged or stained as shown in FIG. 3A, the added signal $RF_0$ obtained from the operational circuit 20 takes a low level $V_L$ as shown by a dot-and-dash line in FIG. 3B which is out of a predetermined range of the amplitude of the added signal $RF_0$ when the beam spot on the optical disc is formed on the non-reflecting portion 2, and accordingly the modified signal $RF_Z$ obtained from the voltage comparator 31 does not have the rectangular waveform corresponding to the arrangement of the pits P, as shown in FIG. 3E. As a result of this, the pulses $SP_A$ and $SP_B$ are not obtained from the pulse generating circuits 32 or 33, so that each of the output signals $TE_A$ and $TE_B$ of the sampling-and-hold circuits 40 and 50 is held at the level obtained just before the beam spot on the optical disc entered into the non-reflecting portion 2 while the beam spot is in the non-reflecting portion, as shown with a dot-and-dash line in FIG. 3F or FIG. 3G. Consequently, the signal $TE_C$ which is used as the tracking error signal and supplied to the driving circuit 70 is also held at the level obtained just before the beam spot entered into the non-reflecting portion 2 while the beam spot is in the non-reflecting portion 2 as shown with a dot-and-dash line in FIG. 3H and represents incorrectly the position of the beam spot on the optical disc in relation to the record track, so that track jump movement of the light beam by which the beam spot on the optical disc is undesirably moved rapidly in the direction transverse to the record tracks, is easy to be caused.

OBJECTS AND SUMMARY OF THE INVENTION

Accordingly, it is an object on the present invention to provide a tracking control arrangement for use in an optical disc player to maintain a light beam impinging on an optical disc to read an information signal therefrom in correct tracking relation to a record track on the optical disc, which can avoid the above mentioned problems in respect of tracking control encountered with the prior art.

Another object of the present invention is to provide a tracking control arrangement for use in an optical disc player in which a light beam is projected onto an optical disc on which an information signal is recorded in a record track and, after reflected at the optical disc, received by a photodetector including a plurality of photodetecting elements, and the outputs of the photodetecting elements are processed to produce a tracking error signal, which causes the tracking error signal to be zero or close to zero while the light beam impinges on a non-reflecting portion of the optical disc, so that track jump movement of the light beam is prevented from occurring.

According to an aspect of the present invention, there is provided a tracking control arrangement for use in an optical disc player having an optical device for causing a light beam to impinge on an optical disc on which an information signal is recorded in the form of a plurality of pits arranged in a record track to read the information signal therefrom, the tracking control arrangement comprising a photodetecting assembly including a plurality of photodetecting elements each provided for receiving a light beam modulated in intensity and reflected at the optical disc to produce an output in response to the light beam received thereby, an operational circuit operative to generate from the outputs of the photodetecting elements a reproduced information signal and a resultant signal varying in phase relative to the reproduced information signal in response to the direction of deviation of a beam spot formed on the optical disc by the light beam from the center of the record track and varying in amplitude in response to the amount of the deviation, a pulse generating circuit for producing on the basis of the reproduced information signal a pulse when the beam spot on the optical disc passes each edge of the pits, sampling means for sampling the level of the resultant signal from the operational circuit by the pulse from the pulse generating circuit, holding means for holding the level sampled by the sampling means in the form of voltage to produce a tracking error signal, discharging means for discharging the voltage held by the holding means gradually with a predetermined discharging time constant which is enough longer than a period in the reproduced information signal corresponding to the maximum interval between two adjacent edges of the pits or immediately after a predetermined period, which is enough longer than the period in the reproduced information signal corresponding to the maximum interval between two adjacent edges of the pits, has passed without obtaining the pulse from the pulse generating circuit, and a driving circuit for driving the optical device in response to the tracking error signal obtained from the holding means to control the position of the beam spot on the optical disc so that the beam spot is correctly located on the record track.

With the tracking control arrangement thus constituted in accordance with the present invention, the tracking error signal which is obtained in the form of the voltage held by the holding means is caused by the discharging means to be zero or close to zero so as to be prevented from representing incorrectly the position of the beam spot on the optical disc in relation to the record track while the beam spot on the optical disc is in a non-reflecting portion of the optical disc and therefore the reproduced information signal has an abnormally low level, so that track jump movement of the light beam is prevented from occurring.

The above and other objects, features and advantages of the present invention will become apparent from the following detailed description taken in conjunction with the accompanying drawings.

BRIEF DESCRIPTION OF THE DRAWINGS

FIG. 1 is a block diagram showing a previously proposed tracking control arrangement employed in an optical disc player;

FIGS. 2A to 2C are illustrations used for explaining the positional relation between a pit in a record track on an optical disc and a beam spot formed on the optical disc by a light beam caused to impinge on the record track;

FIGS. 3A to 3H are waveform diagrams used for explaining the operation of the previously proposed tracking control arrangement shown in FIG. 1;

FIG. 4 is a block diagram showing an embodiment of tracking control arrangement for use in an optical disc player according to the present invention;

FIG. 5 is a block diagram showing another embodiment of tracking control arrangement for use in an optical disc player according to the present invention;

FIGS. 6A to 6G are waveform diagrams used for explaining the operation of the embodiment shown in FIG. 4; and FIGS. 7A to 7H are waveform diagrams used for explaining the operation of the embodiment shown in FIG. 5.

DESCRIPTION OF THE PREFERRED EMBODIMENTS

Now, embodiments of tracking control arrangement for use in an optical disc player according to the present invention will be described with reference to FIGS. 4, 5, 6A to 6G and 7A to 7H of the accompanying drawings hereinafter.

FIG. 4 shows an example of the tracking control arrangement of the present invention. This example employs the aforementioned detecting arrangement so-called "heterodyne system" or "DPD system" in an optical disc player, which has an optical head for causing a light beam to impinge on an optical disc on which an information signal is recorded in the form of a plurality of pits arranged in a record track, in the same manner as the previously proposed tracking control arrangement as shown in FIG. 1. In FIG. 4, elements, circuit blocks and signals corresponding to those of FIG. 1 are marked with the same references and further description thereof will be omitted. In the example of FIG. 4, resistors 43 and 53 are connected in parallel with the capacitors 42 and 52, respectively. The voltage held by the capacitor 42 is to be discharged through the resistor 43 with a discharging time constant determined by the capacitive value of the capacitor 42 and the resistant value of the resistor 43, and the voltage held by the capacitor 52 is to be discharged through the resistor 53 with a discharging time constant determined by the capacitive value of the capacitor 52 and the resistant value of the resistor 53.

The maximum interval between two adjacent edges of the pits on the optical disc is predetermined so as to produce a period of, for example, 2.5 microseconds in the reproduced information signal. On the other hand, in the case where the optical disc has a non-reflecting portion due to damage or a stain on the surface thereof, such a non-reflecting portion is, in general, considerably larger than the maximum interval between two adjacent edges of the pits on the optical disc, so that a portion having an abnormally low level of, for example, about 0.1 millisecond or more is produced in the reproduced information signal in response to the non-reflecting portion.

Accordingly, the discharging time constant set for the capacitor 42 and the resistor 43 or the capacitor 52 and the resistor 53 is selected to be longer than the period in the reproduced information signal corresponding to the maximum interval between two adjacent edges of the pits on the optical disc and shorter than an expected period of the portion of abnormally low level produced in the reproduced information signal in response to the non-reflected portion of the optical disc. By way of a practical example of an embodiment of the present invention, the capacitive value of each of the capacitors 42 and 52 is selected to be 100 pF and the resistance value of each of the resistors 43 and 53 is selected to be 100 KΩ so that the discharging time constant is set to be 10 microseconds.

With the example shown in FIG. 4, when the beam spot on the optical disc traces the record track formed with the arrangement of the pits P along a meandering path 1 and the optical disc has the non-reflecting portion 2 where the surface thereof is damaged or stained as shown in FIG. 6A, the added signal $RF_0$ derived from the adding circuit 23 and used as the reproduced information signal is obtained as shown in FIG. 6B, and the modified signal $RF_Z$ and the pulses $SP_A$ and $SP_B$ are obtained on the basis of the added signal $RF_0$ as shown in FIG. 6C. Further, the subtracted signal $TE_0$ derived from the subtracting circuit 24 is obtained as shown in FIG. 6D, and therefore the output signals $TE_A$ and $TE_B$ obtained across the capacitors 42 and 52 vary as shown in FIGS. 6E and 6F, respectively. As a result of this, the signal $TE_C$ obtained from the differential amplifier 60 and supplied to the driving circuit 70 for controlling the position of the beam spot on the optical disc in relation to the record track so that the beam spot is correctly located on the record track as the tracking error signal varies as shown in FIG. 6G to close to zero or to be zero while the beam spot on the optical disc is in the non-reflecting portion. This means that the signal $TE_C$ is obtained as a tracking error signal which indicates that the beam spot on the optical disc is located almost correctly on the record track in the non-reflected portion.

FIG. 5 shows another example of the tracking control arrangement of the present invention. This example also employs the aforementioned so-called "heterodyne system" or "DPD system" in such an optical disc player as described in connection with the example of FIG. 4. In FIG. 5, elements, circuit blocks and signals corresponding to those of FIG. 4 are marked with the same references and further description thereof will be omitted. In the example of FIG. 5, switches 44 and 54 are connected in parallel with the capacitors 42 and 52, respectively. Further, the pulses $SP_A$ and $SP_B$ derived from the pulse generating circuits 32 and 33 are supplied to monostable multivibrators 34 and 35, each of which is able to be retriggered and has a time constant τ selected to be longer than the period in the reproduced information signal corresponding to the maximum interval between two adjacent edges of the pits on the optical disc, that is, the maximum interval between two adjacent pulses $SP_A$ and $SP_B$. Outputs signals $RM_A$ and $RM_B$ of the monostable multivibrators 34 and 36 are supplied to pulse generating circuits 35 and 37, respectively. Then, output pulses $SW_A$ and $SW_B$ of the pulse generating circuits 36 and 37 are supplied to the switches 44 and 54, respectively.

With the example shown in FIG. 5, when the beam spot on the optical disc traces the record track formed with the arrangement of the pits P along a meandering path 1 and the optical disc has the non-reflecting portion 2 where the surface thereof is damaged or stained as shown in FIG. 7A, the added signal $RF_0$ derived from the adding circuit 23 and used as the reproduced information signal is obtained as shown in FIG. 7B, and the modified signal $RF_Z$ and the pulses $SP_A$ and $SP_B$ are obtained on the basis of the added signal $RF_0$ as shown in FIG. 7C. The monostable multivibrators 34 and 35 are triggered by the pulses $SP_A$ and $SP_B$, respectively, to produce the output signals $RM_A$ and $RM_B$. The output signal $RM_A$ maintains a high level when the beam spot on the optical disc scans a portion other than the non-reflecting portion 2 of the optical disc and the pulse $SP_A$ is normally obtained. The output signal $RM_A$ then falls to a low level from the high level when a period corresponding to the time constant τ has passed from an instant at which the pulse $SP_A$ is obtained just before the beam spot on the optical disc enters into the non-reflecting portion 2, and thereafter maintains the low level, while the beam spot on the optical disc scans the non-reflecting portion 2 and therefore the pulse $SP_A$ is not obtained as shown in FIG. 7D. Similarly, the output signal $RM_B$ maintains a high level when the beam spot on the optical disc scans the portion other than the non-reflecting portion 2 of the optical disc and the pulse $SP_B$ is normally obtained. The output signal $RM_B$ then falls to a low level from the high level when a period corresponding to the time constant τ has passed from an instant at which the pulse $SP_B$ is obtained just before the beam spot on the optical disc enters into the non-reflecting portion 2, and thereafter maintains the low level, while the beam spot on the optical disc scans the non-reflecting portion 2 and therefore the pulse $SP_B$ is not obtained, as also shown in FIG. 7D.

The pulse generating circuits 36 and 37 to which the output signals $RM_A$ and $RM_B$ are supplied, respectively, produce the pulse signals $SW_A$ and $SW_B$ each having narrow pulse-width in response to the falling edges of the output signals $RM_A$ and $RM_B$, respectively, as shown in FIG. 7D. These output pulses $SW_A$ and $SW_B$ turn the switches 44 and 54 on during their pulse-width, respectively.

The subtracted signal $TE_0$ derived from the subtracting circuit 24 is obtained as shown in FIG. 7E, and therefore the output signals $TE_A$ and $TE_B$ obtained across the capacitors 42 and 52 vary as shown in FIGS. 7F and 7G, respectively, so that the output signal $TE_A$ becomes zero due to conduction of the switch 44 after the period corresponding to the time constant τ has passed from the instant at which the pulse $SP_A$ is obtained just before the beam spot on the optical disc enters into the non-reflecting portion 2 while the beam spot on the optical disc scans the non-reflecting portion 2 and the output signal $TE_B$ becomes zero due to conduction of the switch 54 after the period corresponding to the time constant τ has passed from the instant at which the pulse $SP_B$ is obtained just before the beam spot on the optical disc enters into the non-reflecting portion 2 while the beam spot on the optical disc scans the non-reflecting portion 2. As a result of this, the signal $TE_C$ obtained from the differential amplifier 60 and supplied to the driving circuit 70 for controlling the position of the beam spot on the optical disc in relation to the record track so that the beam spot is correctly located on the record track as the tracking error signal varies as shown in FIG. 7H to become zero in a period in which both the output signals $TE_A$ and $TE_B$ are zero. During such a period, the signal $TE_C$ is obtained as a tracking error signal which indicates that the beam spot on the optical disc is located correctly on the record track.

Incidentally, dot-and-dash lines in FIGS. 7F, 7G and 7H show the levels of the output signals $TE_A$ and $TE_B$ and the signal $TE_C$ taken in the case of the previously proposed tracking control arrangement shown in FIG. 1, respectively.

As described above, in the embodiments shown in FIGS. 4 and 5, the signal $TE_C$ which is supplied to the driving circuit 70 for driving the focus lens in the optical head or the optical head in its entirety to control the position of the beam spot on the optical disc so that the beam spot is correctly located on the record track as the tracking error signal, is caused to be zero or close to zero so as to reduce the movement of the beam spot on the optical disc in the direction transverse to the record track while the beam spot is in the non-reflecting portion on the optical disc. Accordingly, track jump movement of the light beam is prevented from occurring while the light beam impinges on the non-reflecting portion of the optical disc.

What is claimed is:

1. In an optical disc player for use with an optical disc having an information signal recorded thereon in the form of a sequence of pits arranged along the median of a record track with a maximum interval between adjacent pits of said sequence and with said disc being susceptible to marring and thereby acquiring a relatively non-reflective surface area extending over a substantial number of said pits and thereby obscuring the respective portion of the recorded information signal; said optical disc player including beam directing means for focussing a light beam at a spot on the optical disc, a tracking control circuit having photodetecting means including a plurality of photodetecting elements each for receiving the light beam reflected from said spot on the optical disc and producing respective output signals in response thereto, circuit means receiving said output signals from said photodetecting elements and generating a reproduced information signal and also a resultant signal upon deviation of said spot from a centered position in respect to said median, said resultant signal varying in phase relative to said reproduced information signal in response to the direction of said deviation of said spot from said median of said record track, and varying in amplitude in response to the amount of said deviation, pulse generating means receiving said reproduced information signal and generating a sampling pulse each time an edge of one of said puts passes said spot of the light beam, sample and hold means for sampling and holding the level of said resultant signal as a tracking error signal in response to each said sampling pulse, and drive circuit means responsive to said tracking error signal for driving said beam directing means to control the position of said spot on said optical disc in the direction across said record track; the improvement comprising discharging means operative independently of said sampling pulse for discharging said sample and hold means a predetermined period after each said sampling of said resultant signal, said predetermined period being at least several times longer than a time period corresponding to said maximum interval and shorter than a time period corresponding to an expected length of said non-reflective surface area along said record track of said optical disc.

2. The improvement of claim 1; wherein said discharging means comprises resistor means connected between said sample and hold means and ground.

3. The improvement of claim 1; wherein said discharging means comprises switch means responsive to a switch control signal for connecting said sample and hold means to ground, and switch signal generating means for generating said switch control signal in response to said reproduced information signal.

4. The improvement of claim 3; wherein said switch signal generating means comprises monostable multivibrator means responsive to said reproduced information signal for generating an output signal, and pulse generating circuit means responsive to said output signal from the monostable multivibrator means for generating said switch control signal.

* * * * *